(12) United States Patent
Shang

(10) Patent No.: US 12,404,953 B2
(45) Date of Patent: Sep. 2, 2025

(54) DRAIN HOSE RESTRICTION DEVICE FOR WASHING MACHINE AND WASHING MACHINE

(71) Applicant: Yuxuan Shang, Irvine, CA (US)

(72) Inventor: Yuxuan Shang, Irvine, CA (US)

( * ) Notice: Subject to any disclaimer, the term of this patent is extended or adjusted under 35 U.S.C. 154(b) by 77 days.

(21) Appl. No.: 18/406,207

(22) Filed: Jan. 7, 2024

(65) Prior Publication Data

US 2024/0209962 A1    Jun. 27, 2024

(30) Foreign Application Priority Data

Jan. 19, 2023    (CN) .......................... 202310056385.2

(51) Int. Cl.
*F16L 3/12* (2006.01)
*D06F 39/08* (2006.01)
*F16L 3/137* (2006.01)

(52) U.S. Cl.
CPC .......... *F16L 3/1211* (2013.01); *D06F 39/083* (2013.01); *F16L 3/137* (2013.01)

(58) Field of Classification Search
CPC ........ F16L 3/1211; F16L 3/137; D06F 39/083
USPC .................... 248/70, 49–74.5; 24/712–715.7
See application file for complete search history.

(56) References Cited

U.S. PATENT DOCUMENTS

| | | | | |
|---|---|---|---|---|
| 2,252,072 A * | 8/1941 | Gerhardt | ............... | D06F 39/083 D32/12 |
| 4,576,664 A * | 3/1986 | Delahunty | ................ | F16L 3/08 24/304 |
| 5,697,128 A * | 12/1997 | Peregrine | ............... | F16G 11/101 24/482 |
| 5,896,623 A * | 4/1999 | Martin | ..................... | F16L 3/233 24/3.13 |
| 7,150,437 B1 * | 12/2006 | Teeters | ....................... | F16L 3/04 248/74.1 |
| 8,904,605 B2 * | 12/2014 | Kawaguchi | ............. | F16G 11/03 D8/383 |
| 2007/0101774 A1 * | 5/2007 | Lee | ........................ | D06F 39/083 68/3 R |
| 2015/0128663 A1 * | 5/2015 | Lee | ........................ | D06F 39/085 68/3 R |
| 2020/0116287 A1 * | 4/2020 | Kim | ........................ | D06F 39/083 |
| 2021/0079978 A1 * | 3/2021 | Kraus | ..................... | F16G 11/14 |

\* cited by examiner

*Primary Examiner* — Christopher Garft

(57) ABSTRACT

A drain hose restriction device and a washing machine are provided, comprising: a base plate for detachably connecting with a body. The drain hose restriction device includes a rope fastening structure, comprising a first part having a mounting cavity and a second part, at least part of the second part being disposed inside the mounting cavity; an elastic member, disposed inside the mounting cavity, with one end against or connected to a wall of the cavity of the mounting cavity, and the other end being pressed against or connected to the second part, being always in a compressed state; a limiting rope, one end of which is threaded through the first part and the second part and is connected to the base plate,, the limiting rope positioned at one side of the first part back away from the base plate forms a limiting ring.

3 Claims, 4 Drawing Sheets

DRAIN HOSE RESTRICTION DEVICE FOR WASHING MACHINE AND WASHING MACHINE

CROSS-REFERENCE TO RELATED APPLICATIONS

This application claims priority to and benefits of Chinese Patent Application No. 2023100563852 filed with China National Intellectual Property Administration on Jan. 19, 2023 and entitled "drain hose restriction device for washing machine and washing machine", the entire contents of each of which are incorporated herein by reference for all purposes. No new matter has been introduced.

FIELD

The present disclosure relates to the technical field of washing machines, and specifically to a drain hose restriction device and a washing machine.

BACKGROUND

As the popularity of cleaning equipment such as washing machines gradually increases, how to enhance the storage effect and user experience is a key concern of various manufacturers.

In the related art, as shown in FIGS. 1 and 2, one end of the drain hose 220' is connected to a drainage chamber of the washing machine 200', and the other end of the drain hose 220' is suspended from the outer wall of the washing machine body 210' by a restriction structure 230'. The restriction structure 230' includes a first slot 231', a second slot 232', and a suspension hook 233'. Specifically, the first slot 231' is disposed on the outer wall of the machine body 210', and the second slot 232' is usually disposed at the other end (the end provided with the water outlet) of the drain 220'. The suspension hook 233' is set in the second slot 232', and the suspension hook 233' and the first slot 231' cooperate with each other to realize the suspension limitation of the drain hose 220'.

In the related art, as shown in FIGS. 1 and 2, one end of the drain hose 220' is connected to the drainage cavity of the washing machine 200', and the other end of the drain hose 220' is suspended from the machine body 210' of the washing machine 200' through the limiting structure 230'. outer wall. The limiting structure 230' includes a first groove 231', a second groove 232' and a suspension hook 233'. Specifically, the first groove 231' is provided on the outer wall of the machine body 210', and the second groove 232' is usually provided at the other end of the drain hose 220' (the end with the water outlet). The suspension hook 233' is set in the second groove 232', and the suspension hook 233' cooperates with the first groove 231' to realize the hanging limit of the drain hose 220'.

This design method has the following limitations: the suspension hook 233' May break (easy to break at A in FIG. 2), and after breaking, it cannot cooperate with the first slot 231', and at this time, the limiting structure 230' no longer has a limiting function; the limiting structure 230' of the second slot 232' and the suspension hook 233' are usually provided at the end of the drain hose 220' provided with a water outlet. Users may replace the drain hose 220' with different lengths according to their needs. In the case that the drain hose 220' is too short, the suspension hook 233' May not be able to reach the first slot 231'; in the case that the drain hose 220' is too long, the storage effect of the drain hose 220' is not ideal when the suspension hook 233' and the first slot 231' are fitted.

Further, the Chinese invention patent with authorization number CN205012064U discloses a hanging device for a washing machine drain hose, including lugs, hooks, a drain hose, and an outer casing. The invention patent realizes the suspension limitation of the drain hose through the mutual cooperation of the hook and the lugs, but still fails to solve the problem that the hook is easy to break.

SUMMARY

In order to solve or ameliorate at least one of the above technical problems, it is an object of the present disclosure to provide a drain hose restriction device.

Another object of the present disclosure is to provide a washing machine having a drain hose restriction device as described above.

To achieve the above purposes, the first aspect of the present disclosure provides a drain hose restriction device. It includes: a base plate, detachably connected to the machine body; a buckle structure, comprising a first part with an installation cavity and a second part at least partially located within the installation cavity; an elastic member, positioned within the installation cavity and remaining in a compressed state, with one end abutting or connected to the cavity wall of the installation cavity, and with the other end abutting or connected to the second part; a limiting rope, with an end threaded through the first part and the second part, connected to the base plate, and with the other end threaded through the first part and the second part, also connected to the base plate, the limiting rope positioned at one side of the first part back away from the base plate forming a limiting ring which is fitted onto the drain hose to limit its position, the first part and the second part being capable of moving relative to the base plate to change the size of the limiting ring.

According to the technical solution of the drain hose restriction device proposed by the present disclosure, the device does not require a suspension hook, and the drain hose can be limited by the limiting ring formed by the limiting rope. Furthermore, the base plate of the drain hose restriction device is detachably connected to the machine body, facilitating the installation of the device at any desired position on the machine body. This allows the limiting ring formed by the limiting rope to effectively limit the position of the drain pipe, regardless of its length, resulting in improved storage efficiency.

Specifically, the drain hose restriction device includes a base plate and a rope buckle structure. Wherein, the base plate is used for detachably connecting with the machine body of the washing machine. It can be understood that the drain hose restriction device is detachably connected to the machine body of the machine, allowing users to install the device at any position of the machine body. Optionally, the base plate and the outer wall of the machine body are detachably connected by means of adhesive bonding, which is easy for users to operate. Alternatively, the base plate and the machine body are detachably connected using a connecting member, which is easy for users to operate. Optionally, the connecting member is a screw or a self-tapping screw. The connecting member is threaded through the base plate and the machine body. The connection element is threadedly connected to the base plate, and the connecting member is threadedly connected to the machine body.

Further, the rope buckle structure includes a first part, a second part, an elastic member, and a limiting rope. Specifically, the first part is disposed on the side of the base plate back away from the machine body. The first part has a mounting cavity. Further, the second part is disposed on the side of the base plate back away from the machine body. At least a portion of the second part is disposed within the mounting cavity. In other words, at least a portion of the second part is disposed in the mounting cavity of the first part. It should be noted that the first portion and the second portion may be of any shape according to practical needs. Further, the elastic member is disposed in the mounting cavity. One end of the elastic member is pressed against or connected to the wall of the mounting cavity. The other end of the elastic member is pressed against or connected to the second part. Further, one end of the limit rope threaded through and connected to both the first part and the second part, as well as the base plate. The other end of the limit rope is also threaded through and connected to both the first part and the second part, as well as the base plate. The elastic member is always in a compressed state. The second part always tends to be detached from the mounting cavity of the first part under the action of the elastic force of the elastic member. Therefore, the limiting rope threaded through the first part and the second part are subjected to significant friction. Without external force, it is difficult for the limiting rope to change their positions with respect to the first part or the second part. When users press down on the second part (applying an external force), the elastic member inside the installation cavity is further compressed. At this time, the friction on the limiting rope which is threaded through the first part and the second part decreases, allowing the first part and the second part to slide on the limiting rope, thus changing the positions of the limiting rope with respect to the first part and the second part.

Further, the limiting rope positioned at one side of the first part back away from the base plate forms a limiting ring. The first part and the second part are able to move relative to the base plate to change the size of the limiting ring. By adjusting the size of the limiting ring, it can accommodate a wider range of drain hoses, making it highly versatile. Furthermore, the limiting ring is fitted onto the drain hose to provide limitation for the drain hose.

In the technical solution described by the present disclosure, the drain hose restriction device does not require a suspension hook, instead utilizes a limiting rope to form a limiting ring for restricting the drain hose. Furthermore, the base plate of the drain hose restriction device is detachably connected to the machine body, allowing for convenient installation at any desired position. This design enables the limiting ring formed by the limiting rope to effectively restrict the drain pipe at various positions, regardless of its length, thereby enhancing the storage effect.

Furthermore, the above technical solution provided by the present disclosure can also have the following additional technical features:

In the above technical solution, the first part is provided with two first holes that are in communication with the installation cavity, and the second part is provided with two second holes, and each end of the limiting rope is threaded through a corresponding first hole as well as the second hole.

In this technical solution, by pre-setting a first hole on the first part and a second hole on the second part, it is convenient to quickly thread the limiting rope through the first part and the second part. The second part always has a tendency to be detached from the mounting cavity of the first part under the action of the spring force. The centerline of the first hole and the centerline of the second hole have a tendency to move away from each other, so that the limiting rope threaded through the first hole and the second hole are subjected to a large friction force. In the absence of an external force, it is difficult for the limit rope to change its position relative to the first part or the second part. Users presses down on the second part (applying an external force) to further compress the elastic member in the mounting cavity, at which time the centerline of the first hole and the centerline of the second hole are close to each other, so that the friction applied to the limit rope is reduced, and the first part as well as the second part can be slid on the limit rope.

In the above technical solution, the elastic member is a spring; or the elastic member is a leaf spring; or the elastic member is a rubber block.

In this technical solution, by setting the elastic member as a spring or a leaf spring or a rubber block, and the elastic member is always in a compressed state, the second part always has a tendency to be detached from the mounting cavity of the first part under the action of the spring's elastic force, and therefore the limit rope threaded through the first part and the second part are subjected to a great friction. It is difficult for the limit rope to have a change of relative positions with the first part or the second part in the absence of the action of an external force. Users presses down on the second part (applying an external force) to further compress the elastic member in the mounting cavity, at which time the friction of the limit rope threaded through the first part and the second part decreases, and the first part as well as the second part can slide on the limit rope to change their positions relative to the limit rope.

In the above technical solution, the base plate is adhered to the outer wall of the machine body.

In this technical solution, the base plate and the outer wall of the machine body are detachably connected by means of adhesion, which is easy for users to operate. In the technical solution described by the present disclosure, the added drain hose restriction device does not need to change the original structure of the washing machine, and is highly versatile. Optionally, the drain hose restriction device is an independent structure. One of the sides of the base plate is provided with an adhesive layer and a protective layer. When it is necessary to use the drain hose restriction device, users can tear off the protective layer and directly press the adhesive layer against the machine body.

In the above technical solution, the base plate and the machine body are detachably connected by means of a connecting member.

In this technical solution, by providing the connecting member, it is possible to realize a detachable connection between the base plate and the machine body, which is easy to be operated by users. It is worth stating that the number of the connecting member is at least one, i.e., the connecting member may be one, two, or more than one. Considering factors such as convenience of operation, connection strength between the base plate and the machine body in the connected state, cost, and other factors, the connecting member is flexibly set according to specific requirements and practical needs. Optionally, the connecting member is a screw. Optionally, the connecting member is a self-tapping screw.

In the above technical solution, the connecting member is a self-tapping screw, which is threaded with the base plate and the machine body.

In this technical solution, the connectors are designed as self-tapping screws, making it convenient for users to install and remove the drain hose restriction device. Additionally, the drain hose restriction device can be installed at any position of the machine body.

In the above technical solution, the drain hose restriction device further comprises at least two fixing portions for connecting the base plate to one end of the limiting rope and connecting the base plate to the other end of the limiting rope.

In this technical solution, the drain hose restriction device further comprises at least two fixing portions. Specifically, the at least one fixing portion is for connecting the base plate to one of the ends of the limiting rope. The at least one fixing portion is for connecting the base plate with the other end of the limiting rope. By providing the fixing portion, it is possible to connect an end of the limit rope to the base plate. Each of the two ends of the limit rope is connected to the base plate by the at least one fixing portion.

In the above technical solution, the rope buckle structure further comprises a pulling portion disposed in the limit ring.

In this technical solution, the rope buckle structure further comprises a pulling portion. Specifically, the pulling portion is located on the limit ring. By providing the pulling portion, users can easily pull the limiting rope, enhancing user experience. Optionally, the pulling portion can be of any shape.

In the above-described technical solution, the rope buckle structure further comprises a pressing portion, which is disposed at an end of the second portion that is outside the mounting cavity.

In this technical solution, the rope buckle structure further comprises a pressing portion. Specifically, the pressing portion is provided at an end of the second part that is outside the mounting cavity. By providing the pressing portion, it is convenient for users to press down on the second part, improving users experience. Optionally, the pressing portion may be a slot structure.

A second aspect of the present disclosure provides a washing machine comprising: a machine body; a drain hose, which is connected to the machine body; and a drain hose restriction device in any of the above technical solutions, wherein a base plate of the drain hose restriction device is detachably connected to the machine body, and a limiting ring of the drain hose restriction device is fitted onto the drain hose.

According to a technical solution of the washing machine of the present disclosure, the washing machine comprises a body, a drain hose, and a drain hose restriction device in any of the above technical solutions. Specifically, a base plate of the drain hose restriction device is detachably connected to the machine body. It can be understood that the drain hose restriction device is detachably connected to the machine body, making it convenient for users to install the drain hose restriction device at any position of the machine body. Optionally, the base plate and the outer wall of the machine body are detachably connected by means of adhesion, which is easy for users to operate. Optionally, the base plate and the machine body are detachably connected by means of a connecting member, which is easy for users to operate. Optionally, the connecting member is a screw or a self-tapping screw. The connecting member is threaded through the base plate and the machine body. The connecting member is threadedly connected to the base plate and the machine body. Further, a limiting ring of the drain hose restriction device is fitted onto the drain hose to restrict the drain hose.

Wherein, since the washing machine comprises any of the drain hose restriction devices in the first aspect described above, it has the beneficial effect of any of the technical solutions described above, which will not be repeated herein.

Additional aspects and advantages of the technical embodiments of the present disclosure will become apparent in the following descriptive portions or through the practice of the disclosure.

BRIEF DESCRIPTION OF THE DRAWINGS

What are described above and/or additional aspects and advantages of the present disclosure will become obvious and comprehensible from the following description of embodiments in conjunction with the accompanying drawings.

Figure 1:
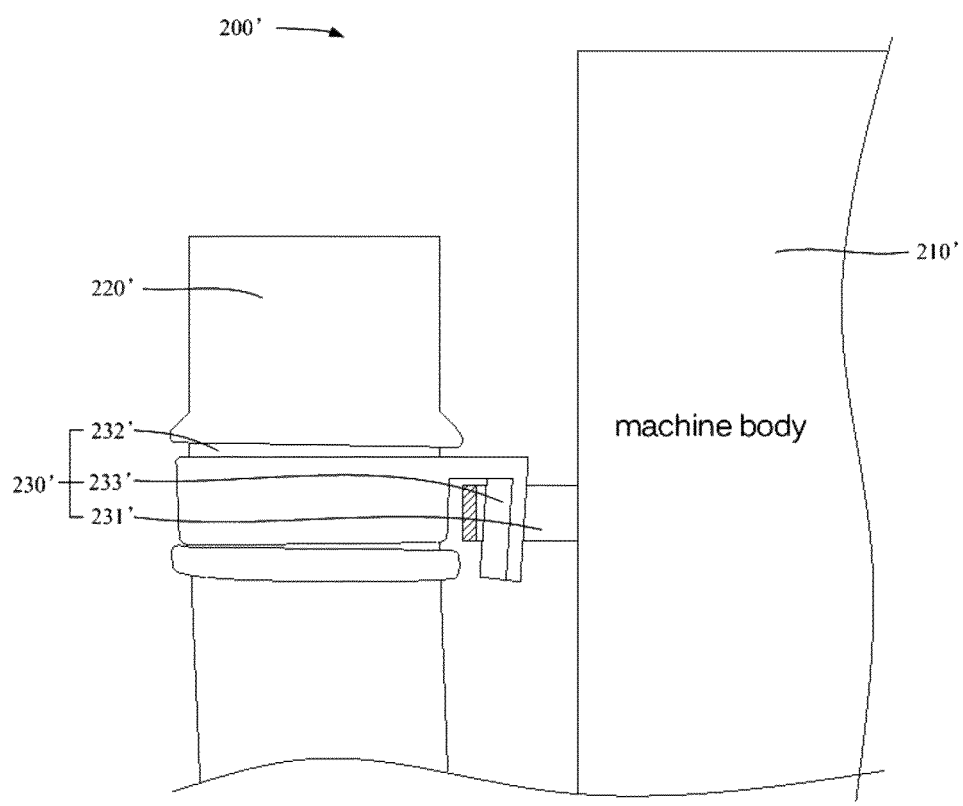
FIG. 1 illustrates a schematic diagram of a washing machine in the related art.
Figure 2:
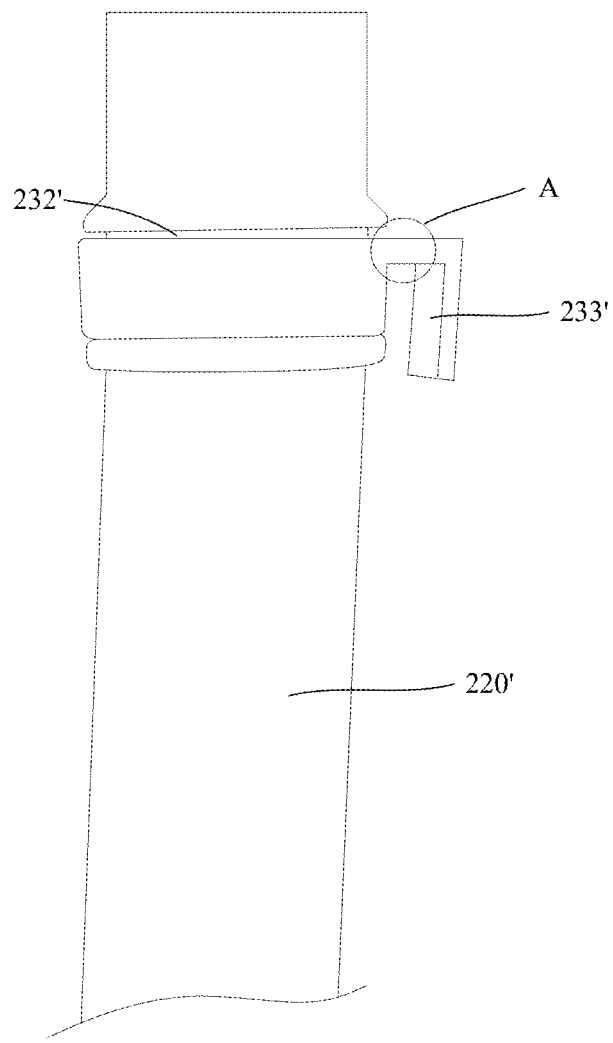
FIG. 2 illustrates a schematic view of a drain hose in the related art.

Wherein, the correspondence between the accompanying markings and the names of the parts in FIGS. 1 and 2 is:
200': washing machine; 210': machine body; 220': drain hose; 230': restriction structure; 231': first slot; 232': second slot; 233': suspension hook.

Figure 3:
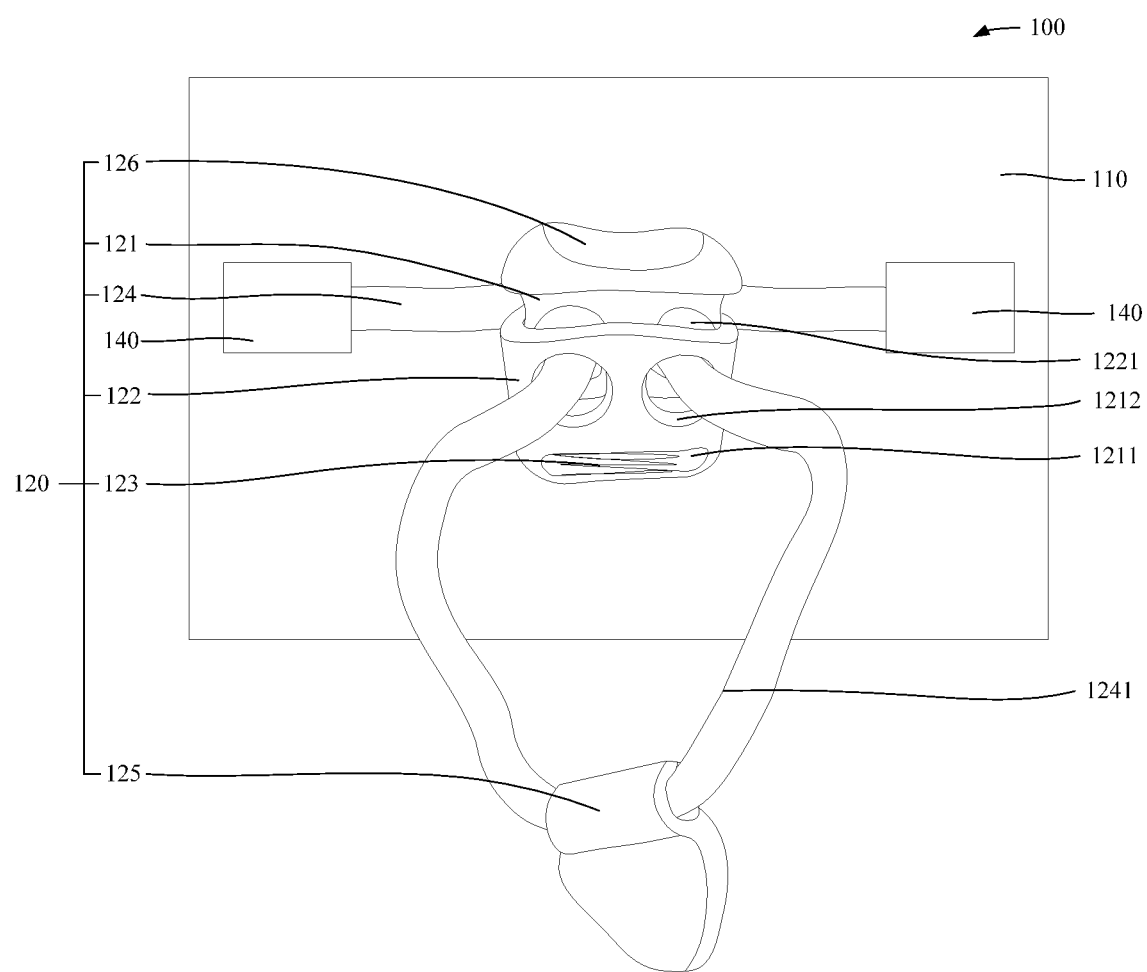
FIG. 3 illustrates a schematic view of a drain hose restriction device according to an embodiment of the present disclosure.
Figure 4:
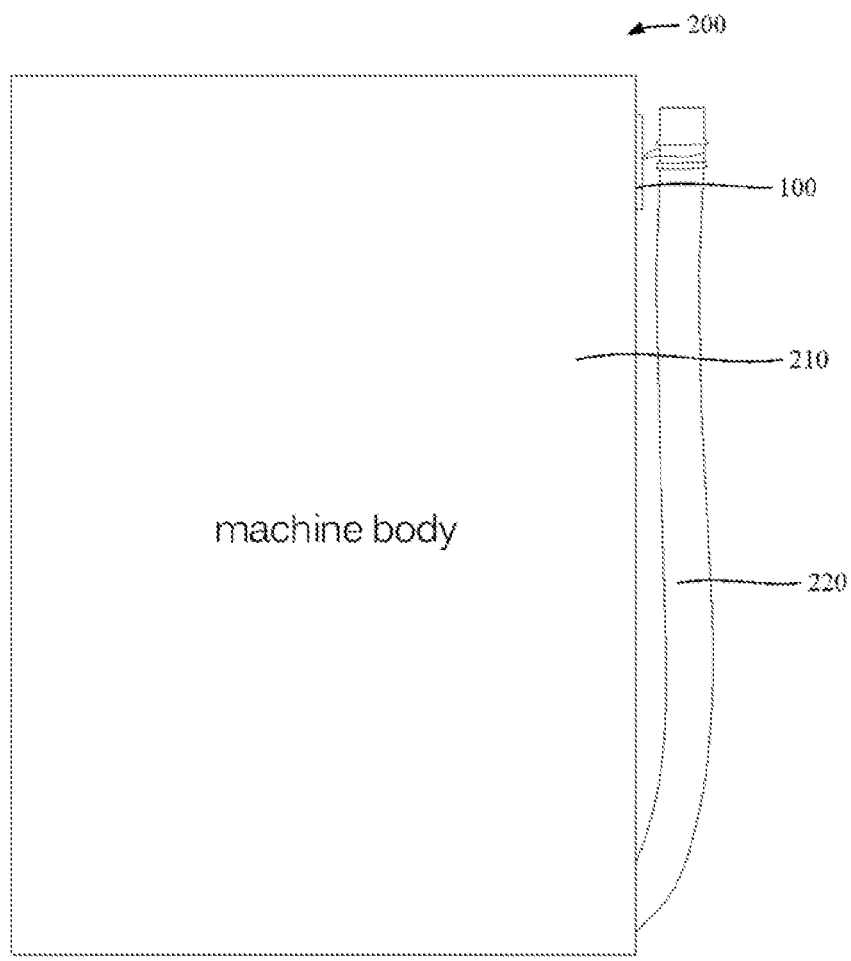
FIG. 4 illustrates a schematic view of a washing machine according to an embodiment of the present disclosure.

The correspondence between the accompanying markings and the names of the parts in FIGS. 3 and 4 is:
100: drain hose restriction device; 110: base plate; 120: rope buckle structure; 121: first part; 1211: mounting cavity; 1212: first hole; 122: second part; 1221: second hole; 123: elastic member; 124: limiting rope; 1241: limiting ring; 125: pulling portion; 126: pressing portion; 140: fixing portion; 200: washing machine; 210: machine body; 220: drain hose.

DETAILED DESCRIPTION OF THE DISCLOSURE

To make the above objectives, features and advantages of the present disclosure more obvious and comprehensible, the present disclosure will be described in detail below with reference to accompanying drawings and specific embodiments. It should be noted that embodiments in the present disclosure and features in the embodiments can be combined with one another if there is no conflict.

Many specific details are set forth in the following description to facilitate full understanding of the present disclosure, but the present disclosure can further be implemented in other ways different from those described herein, and therefore, the protection scope of the present disclosure is not limited by the specific embodiments disclosed below.

A drain hose restriction device 100 and a washing machine 200 provided according to some embodiments of the present disclosure are described below with reference to FIGS. 3 and 4.

In an embodiment according to the present disclosure, as shown in FIG. 3, the drain hose restriction device 100 comprises a base plate 110 and a rope buckle structure 120. wherein the base plate 110 is used for detachably connecting with the body 210 of the washing machine 200. It can be understood that the drain hose restriction device 100 is detachably connected to the machine body 210 to facilitate users to install the drain hose restriction device 100 at any position of the machine body 210 (the drain hose restriction device 100 is provided at any position convenient for storing the drain hose 220). Optionally, the base plate 110 and the outer wall of the machine body 210 are detachably connected by means of adhesion, which is easy for users to operate. Optionally, the base plate 110 and the machine body 210 are detachably connected by the connecting member 130, which is easy to be operated by users. Optionally, the connecting member 130 is a screw or a self-tapping screw. The connecting member 130 is disposed on the base plate 110 and the machine body 210. the connecting member 130 is threadedly connected to the base plate 110 and the machine body 210.

Further, as shown in FIG. 3, the rope buckle structure 120 includes a first portion 121, a second portion 122, an elastic member 123, and a limiting rope 124. specifically, the first portion 121 is disposed on the side of the base plate 110 that is backed away from the machine body 210. The first portion 121 has a mounting cavity 1211. further, the second portion 122 is disposed on the side of the base plate 110 back from the machine body 210. At least a portion of the second portion 122 is disposed within the mounting cavity 1211. In other words, at least a portion of the second portion 122 is provided within the mounting cavity 1211 of the first portion 121. It is worth stating that the first portion 121 and the second portion 122 may be of any shape according to practical needs. Further, the elastic member 123 is disposed within the mounting cavity 1211. One end of the elastic member 123 is pressed against or connected to a cavity wall of the mounting cavity 1211. The other end of the elastic member 123 is pressed against or connected to the second portion 122. Further, one end of the limit rope 124 is threaded through the first portion 121 and the second portion 122 and is connected to the base plate 110. The other end of the limit rope 124 is threaded between the first portion 121 and the second portion 122 and connected to the base plate 110. The elastic member 123 is always in a compressed state. The second portion 122 always tends to detach from the mounting cavity 1211 of the first portion 121 under the action of the spring force. Therefore, the limit rope 124 threaded through the first portion 121 and the second portion 122 is subjected to a great friction, and it is very difficult for the limit rope 124 to change its relative position with the first portion 121 or the second portion 122 without the action of an external force. Users presses down on the second part 122 (applying an external force) to further compress the elastic member 123 in the mounting cavity 1211, at which time the frictional force of the limit rope 124 threaded through the first part 121 and the second part 122 is reduced, and the first part 121 and the second part 122 can slide along the limit rope 124 to change the relative position of the first part 121 or the second part 122 to the limit rope 124.

Further, the limiting rope 124 is disposed on a side of the first part 121 back from the base plate 110 to form the limiting ring 1241. the first part 121 and the second part 122 are capable of moving relative to the base plate 110 to change the size of the limiting ring 1241. By changing the size of the limit ring 1241, it can accommodate a wider range of sizes for the drain hose 220, thus enhancing its versatility. Furthermore, the limit ring 1241 is fitted onto the drain hose 220 to restrict its movement.

In the technical solution described by the present disclosure, the drain hose restriction device 100 does not require a suspension hook, instead utilizes a limiting rope 124 to form a limiting ring 1241 for restricting the drain hose 220. In addition, the base plate 110 of the drain hose restriction device 100 is detachably connected to the machine body 210, allowing for convenient installation of the device 100 at any desired position of the machine body 210. This design enables the limiting ring 1241 formed by the limiting rope 124 to effectively restrict the drain hose 220 at various positions, regardless of its length, thereby enhancing the storage effect.

In an embodiment according to the present disclosure, as shown in FIG. 3, the first part 121 is provided with two first holes 1212 which are connected to the mounting cavity 1211, and the second part 122 is provided with two second holes 1221, and each of the two ends of the limiting rope 124 is threaded through the corresponding one first hole 1212 and one second hole 1221. By presetting the first hole 1212 on the first part 121 and the second hole 1221 on the second part 122, it is convenient to quickly pass the limiting rope 124 through the first part 121 and the second part 122. under the action of spring force, the second part 122 always tends to detach from the mounting cavity 1211 of the first part 121. The centerline of the first hole 1212 and the centerline of the second hole 1221 tend to move away from each other, resulting in significant friction on the limit rope 124 threaded through the first hole 1212 and the second hole 1221. Without external force, it is difficult for the limit rope 124 to change its relative position with the first part 121 or the second part 122. When the user presses down on the second part 122 (applying external force), the elastic component 123 inside the installation chamber 1211 further compresses. At this time, the centerline of the first hole 1212 and the centerline of the second hole 1221 approach each other, reducing the friction on the limit rope 124. As a result, the first part 121 and the second part 122 can slide along the limit rope 124.

In an embodiment according to the present disclosure, the elastic member 123 is a spring; or the elastic member 123 is a leaf spring; or the elastic member 123 is a rubber block. By setting the elastic component 123 as a spring, elastic sheet, or rubber block and keeping it in a compressed state, the second part 122 always tends to detach from the installation chamber 1211 of the first part 121 under the action of the spring force. Therefore, the limit rope 124 threaded through the first part 121 and the second part 122 will experience significant friction. Without external force, it is difficult for the limit rope 124 to change its relative position with the first part 121 or the second part 122. When the user presses down on the second part 122 (applying external force), the elastic component 123 inside the installation chamber 1211 further compresses. As a result, the friction on the limit rope 124 threaded through the first part 121 and the second part 122 decreases, allowing the first part 121 and the second part 122 to slide along the limit rope 124 and change their relative positions with the limit rope 124.

In an embodiment according to the present disclosure, the base plate 110 and the outer wall of the machine body 210 are detachably connected by means of adhesion, which is easy to be operated by users. In the technical solution limited by the present disclosure, the newly added drain hose restriction device 100 does not require any modification to the existing structure of the washing machine 200, making it highly versatile. Optionally, the drain hose restriction device 100 is a separate structure. One side of the base plate 110 is provided with an adhesive layer a protective layer. When it is necessary to use the drain hose restriction device 100, users can tear off the protective layer and directly place the adhesive layer against the machine body 210.

In an embodiment according to the present disclosure, the base plate 110 and the machine body 210 are detachably connected by the connecting member 130. By providing the connecting member 130, the detachable connection between the base plate 110 and the machine body 210 can be realized, which is easy to be operated by users. It is worth stating that the number of the connecting members 130 is at least one, i.e., the connecting members 130 may be one, two, or more than one. Considering factors such as convenience of operation, connection strength between the base plate and the machine body in the connected state, cost, and other factors, the connecting member 130 is flexibly set according to specific requirements and practical needs. Optionally, the connecting member 130 is a screw. Optionally, the connecting member 130 is a self-tapping screw.

Further, the connecting member 130 is a self-tapping screw which is threadedly connected to the base plate 110 and the machine body 210. By setting the connecting member 130 as a self-tapping screw, it is convenient for a user to install and remove the drain hose restriction device 100, and the drain hose restriction device 100 can be installed at any position of the machine body 210.

In an embodiment according to the present disclosure, as shown in FIG. 3, the drain hose restriction device 100 further comprises at least two fixing portions 140. specifically, the at least one fixing portion 140 is for connecting the base plate 110 to one end of the limiting rope 124. The at least one fixing portion 140 is for connecting the base plate 110 with the other end of the limit rope 124. By providing the fixing portion 140, it is possible to connect an end of the limit rope 124 to the base plate 110. Each of the two ends of the limit rope 124 is connected to the base plate 110 by the at least one fixing portion 140.

In an embodiment according to the present disclosure, as shown in FIG. 3, the rope buckle structure 120 further comprises a pulling portion 125. Specifically, the pulling portion 125 is provided at the limit ring 1241. By providing the pulling portion 125, users can easily pull the limit rope 124, enhancing user experience. Optionally, the pulling and portion 125 can be of any shape.

In an embodiment according to the present disclosure, as shown in FIG. 3, the rope buckle structure 120 further comprises a pressing portion 126. specifically, the pressing portion 126 is provided at an end of the second portion 122 that is outside the mounting cavity 1211. By providing the pressing portion 126, users can easily press down on the second portion 122, enhancing user experience. Optionally, the pressing portion 126 may be a slot structure.

In an embodiment according to the present disclosure, the limiting ring 1241 of the rope buckle structure 120 may be adjustable in caliber to facilitate limiting of the drain hose 220. Optionally, the limiting rope 124 may be disposed in a second slot of the drain hose 220 to limit the drain hose 220. It is worth stating that the limiting rope 124 can restrict any position of the drain hose 220 (regardless of the length of the drain hose 220) for better storage.

In an embodiment according to the present disclosure, as shown in FIG. 4, the washing machine 200 comprises a machine body 210, a drain hose 220, and a drain hose restriction device 100 in any of the above embodiments. Specifically, the base plate 110 of the drain hose restriction device 100 is detachably connected to the machine body 210. It is to be understood that the drain hose restriction device 100 is detachably connected to the machine body 210 to facilitate a user to install the drain hose restriction device 100 at any position of the machine body 210. Optionally, the base plate 110 is detachably connected to the outer wall of the machine body 210 by means of adhesion, which is easy for users to operate. Optionally, the base plate 110 and the machine body 210 are detachably connected by means of a connecting member 130, which is easy to be operated by users. Optionally, the connecting member 130 is a screw or a self-tapping screw. The connecting member 130 is threaded through the base plate 110 and the machine body 210. the connecting member 130 is threadedly connected to the base plate 110 and the machine body 210. Further, the limiting ring 1241 of the drain hose restriction device 100 is fitted onto the drain hose 220 to restrict the drain hose 220.

According to the embodiment of the drain hose restriction device and the washing machine of the present disclosure, the drain hose restriction device does not require a suspension hook, and the drain hose can be limited by the limiting ring formed by the limiting rope. In addition, the base plate of the drain hose restriction device is detachably connected to the machine body, which facilitates the installation of the drain hose restriction device at any position of the machine body, so that the limiting ring formed by the limiting rope can limit the drain hose at any position of the drain hose (regardless of the length of the drain hose), and the storage effect is enhanced.

In the present disclosure, the terms "first", "second", "third" are used for descriptive purposes only and are not to be construed as indicating or implying relative importance; the term "more than one" refers to two or more, unless otherwise expressly limited. "plurality" refers to two or more, unless otherwise expressly limited. The terms "mounted", "connected", "linked", "attached", "secured", etc. are to be understood in a broad sense, e.g. The term "connection" May be a fixed connection, a removable connection, or a connection in one piece; the term "connection" May be a direct connection or an indirect connection through an intermediate medium. For those of ordinary skill in the art, the specific meaning of the above terms in the present disclosure may be understood according to the specific circumstances.

In the description of the present disclosure, it is to be understood that the terms "up", "down", "left", "right", "front", "back", etc. indicate orientation or positional relationships based on those shown in the accompanying drawings, and are intended only to facilitate and simplify the description of the present disclosure, and do not indicate or imply that the device or unit referred to must be oriented, constructed and operated in a particular direction, or in a particular orientation. orientation to be constructed and operated and, therefore, are not to be construed as a limitation of the present disclosure.

In the description of the present disclosure, the terms "an embodiment", "some embodiments", "specific embodiment", etc. indicate that specific features, structures, materials or characteristics described in conjunction with the embodiment or illustrative description are included in at least one embodiment or instance of the present disclosure. In the present disclosure, the schematic description of the above terms does not necessarily refer to the same embodiment or instance. Moreover, the specific features, structures, materials or characteristics described can be combined in a suitable way in any one or more embodiments or instances.

What are described above are merely some embodiments of the present disclosure and are not intended to limit the present disclosure, and various changes and modifications can be made by those skilled in the art. Any modifications, equivalent substitutions, improvements, etc. made within the spirit and principle of the present disclosure should fall within the protection scope of the present disclosure.

What is claimed is:

1. A washing machine, comprising:
a machine body (210);
a drain hose (220), connected to said body (210);
a drain hose restriction device (100) comprising:

a base plate (110), for removable attached to said machine body (210);

a rope buckle structure (120), including first section (121) with a mounting cavity (1211) and second portion (122), at least part of said second portion (122) being disposed within said mounting cavity (1211);

an elastic member (123), provided within said mounting cavity (1211), one end of said elastic member (123) being pressed against or connected to a wall of said mounting cavity (1211), and the other end of said elastic member (123) being pressed against or connected to said second portion (122), with said elastic member (123) being always in a compressed state;

a limiting rope (124), one end of said limiting rope (124) is threaded through said first part (121) and said second part (122) and connected to said base plate (110), the other end of said limiting rope (124) is threaded through said first part (121) and said second part (122) and is connected to said base plate (110), said limiting rope (124) positioned at the side of said first part (121) back away from said base plate (110) forming a limiting ring (1241), said first part (121) and said second part (122) being able to move relative to said base plate (110) to change the size of said limiting ring (1241), and said limiting ring (1241) being fitted onto a drain hose (220) to limit said drain hose (220), wherein the base plate (110) of said drain hose restriction device is detachably connected to said body (210), and said limiting ring (1241) of said drain hose restriction device is fitted onto said drain hose (220).

2. The washing machine according to claim 1, wherein:

said first part (121) is provided with two first holes (1212), said first holes (1212) being in communication with said mounting cavity (1211), and said second part (122) is provided with two second holes (1221), and each of the two ends of said limiting rope (124) is threaded through the corresponding one first hole (1212) and one second hole (1221).

3. The washing machine according to claim 1, wherein: said elastic member (123) is a spring.

* * * * *